United States Patent [19]
Coulter

[11] 3,840,739
[45] Oct. 8, 1974

[54] APPARATUS AND METHOD FOR TRACKING A RAISED EDGE WITHOUT SHADOW INTERFERENCE

[75] Inventor: Alvin B. Coulter, Ann Arbor, Mich.

[73] Assignee: The Gerber Scientific Instrument Company, South Windsor, Conn.

[22] Filed: Aug. 3, 1973

[21] Appl. No.: 385,276

[52] U.S. Cl. .............................. 250/202, 318/577
[51] Int. Cl. ........................................ G05b 1/00
[58] Field of Search .......... 250/202; 178/18, 19, 20; 235/610; 318/577

[56] References Cited
UNITED STATES PATENTS

| 3,017,552 | 1/1962 | Brouwer | 250/202 |
| 3,135,904 | 6/1964 | Purkhiser | 250/202 |
| 3,335,287 | 8/1967 | Hargens | 250/202 |
| 3,423,590 | 1/1969 | Jewell | 250/202 |
| 3,496,437 | 2/1970 | Layden | 250/202 |
| 3,609,237 | 9/1971 | Gerber | 250/202 |
| 3,704,373 | 11/1972 | Bardwell | 318/577 |

Primary Examiner—James W. Lawrence
Assistant Examiner—D. C. Nelms
Attorney, Agent, or Firm—McCormick, Paulding & Huber

[57] ABSTRACT

An optical line follower in which shadow error is eliminated while following a raised edge by selectively projecting light upon the raised edge in response to follower location or direction of motion to thereby eliminate shadows.

31 Claims, 8 Drawing Figures

APPARATUS AND METHOD FOR TRACKING A RAISED EDGE WITHOUT SHADOW INTERFERENCE

BACKGROUND OF THE INVENTION

This invention relates to optical line followers and more particularly to optical line followers which are intended to track a raised edge of an object. The raised edge can create position error by casting a shadow on the support surface and causing the line follower to indiscriminately track the shadow or the edge.

In the optical line follower art, a line or raised edge is scanned by a photodetector, such as a vidicon tube that is sensitive to differences in light intensity. The detector senses the difference in reflected light between the line or edge and the surrounding surfaces and produces a series of output pulses each time the line or edge is crossed. These pulses control the motion of the optical line follower in tracking the line or edge.

When the raised edge of an object being tracked casts shadows, the detector may be caused to produce faulty signals and thereby prevent the follower from tracking the raised edge accurately. General illumination of the area of the line follower does not solve this problem because the shadows continue to be cast in spite of general illumination.

SUMMARY OF THE INVENTION

In accordance with the present invention, an optical head of the line follower is mounted for motion along orthogonal X and Y coordinate axes relative to the workpiece whose edge is to be tracked so that the optical axis of the head intersects the edge. The direction of motion of the head is detected, and associated means generates illumination of the raised edge from a position which eliminates the shadows at the point on the edge being tracked by the optical axis of the head.

In accordance with a further aspect of the present invention, at least three and preferably four selectively operable light sources are mounted to travel with the optical head and to be selectively actuated in accordance with the detected motion of the head to illuminate the raised edge from the side. Light from the sources strikes the object and supporting surface to eliminate as much reflected glare as possible. A greater number of light sources may be used to illuminate the raised edge of the object being tracked with one or more lights providing illumination at the same time. Preferably, however, four light sources are used as a minimum to provide illumination in each of four quadrants in which the edge may extend. Proper illumination of the raised edge permits accurate tracking and recording of data defining the edge and, therefore, the shape of the object.

A primary object of the present invention, therefore, is to provide apparatus and method for selectively illuminating a raised edge being tracked by an optical follower so as to prevent the formation of shadows by the edge.

DESCRIPTION OF THE PREFERRED EMBODIMENT

Figure 1:
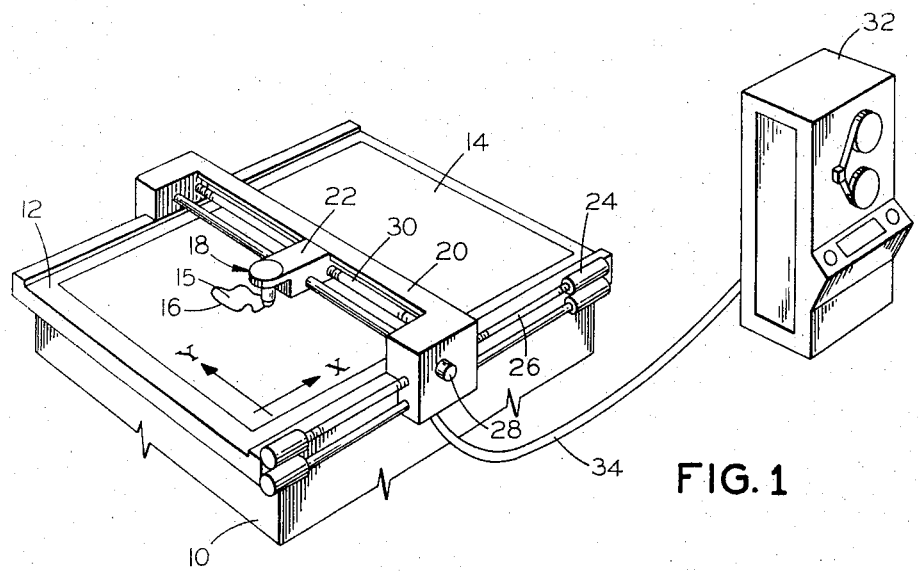
FIG. 1 is a perspective view of a line follower in which the present invention may be utilized.

Referring to FIG. 1 we see an optical line follower in which the present invention is employed. The line follower includes a support table 10 defining a smooth supporting surface 12 upon which a contrast paper 14 and an object 15 may be positioned in a flattened condition to have a raised edge 16 of the object followed and defined. Theoretically a line defined by the intersection of a vertical raised edge and the paper or other support surface is also followed. The edge to be followed may be the edge of a machined part or template for which mechanical drawings or cutting programs are desired.

In FIG. 1 the optical tracking head 18 of the line follower is supported above the table 10 for controlled movement along orthogonal X and Y coordinate axes illustrated on surface 12. The motion of the optical head 18 is accomplished by an X-axis carriage 20 and a Y-axis carriage 22. Y-axis carriage 22 is connected directly to the optical head 18 and is, in turn, supported by the X-axis carriage 20. To cause optical head 18 to move along the X-axis, a command signal is given to the X-axis drive motor 24, which is preferably a reversible electric motor, and which drives a lead screw 26 engaging the X-axis carriage 20 to move the carriage selectively back and forth in the X-axis direction together with the Y-axis carriage 22 and the optical head 18. Optical head 18 can be caused to move in the Y-axis direction by imparting a command signal to Y-axis drive motor 28, which also is preferably a reversible electric motor, and which serves to rotate lead screw 30, which is connected to Y-axis carriage 22 to cause the Y-axis carriage 22 to move selectively back and forth on the X-carriage 20. Since the optical head 18 can be moved with X-axis carriage 20 and Y-axis carriage 22 simultaneously, it will be evident that in conventional fashion, the head 18 can move in any direction across horizontal surface 12. Typically the motions of the carriages and head 18 are controlled by command signals from a controller 32 through a conduit 34. The command signals are produced from information from the head identifying the line or edge viewed by the head. The information is processed in the controller and the resulting command signals cause the head to advance along and track the edge while a record or definition of the edge is made, preferably in digital form.

Optical head 18 of the line follower scans the edge 16 of the workpiece 15 in a circular scan path and produces an output pulse each time the edge is crossed. The output pulses so produced are transmitted to a pulse phase comparator which accepts pulses occurring within a given portion of the circular scan path, referred to as the "aperture" of the comparator, and which produces an error signal representative of the deviation of the centers of the accepted pulses from the center of the aperture. The error signal shifts the phase of a variable frequency oscillator, which in turn controls the angular position of the aperture along the scan path to slave the center of the aperture to the centers of the accepted pulses. The phase of the variable frequency oscillator output is then compared to the phase of a reference oscillator by a phase detector to produce two coordinate drive signals, the resultant of which is a vector having a direction related to the direction of the line at the point of scanning. These two drive or command signals are respectively applied to the X and Y coordinate axes drive motors 24 and 28 to drive the optical head along the line or edge being followed. Since it is important to record a definition of the line or edge being followed, the X and Y coordinate command signals are recorded as they are produced through digital encoders driven by the X- and Y-axis drive motors 24 and 28. A more detailed operation of an optical line follower is not deemed necessary for the present purposes and full details of such a follower may be found in U.S. Pat. No. 3,529,084, assigned to the assignee hereof, to which reference may be had.

Experience has shown that when an optical line follower attempts to track the raised edge of a three dimensional object, such as a templet, to determine the shape thereof, shadows cast by the templet on the contrast paper 14 lying on supporting surface 12 often cause the optical head 18 to mistake the edge of the shadow for the raised edge of the object and thereby produce erroneous command signals and edge data.

The primary object of this invention is to disclose apparatus and method for preventing the formation or casting of shadows by three dimensional objects whose edges are being scanned in a line-follower operation by an optical head. This is accomplished by selectively illuminating the edge of the three dimensional object, hereinafter referred to as a templet, during the line following operation. The significance of the selective illumination will be developed as this description proceeds in conjunction with the fact that a general illumination of the area in which the templet is located does not prevent the formation of shadows. This selective illumination is accomplished by mounting light sources for motion with the optical head and selectively positioning and actuating these light sources so that the templet edge being followed at any given time is fully illuminated.

Figure 2:
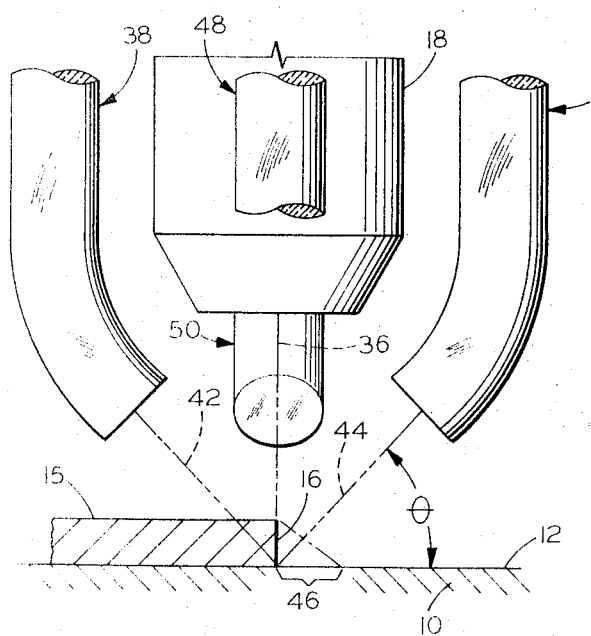
FIG. 2 is an enlarged view of the optical head in the line follower with four light sources mounted in accordance with the present invention with the head to illuminate the edge of the workpiece being tracked.

The invention can better be appreciated by referring to the enlarged view in FIG. 2 wherein the three dimensional templet 15 is shown positioned on the horizontal surface 12 of table 10 under the optical head 18 with its scanning or optical axis 36 intersecting the raised edge 16 of the templet and hence the line formed by the intersection of the templet edge and the surface 12. For simplicity, the contrast paper 14 in FIG. 1 is not illustrated in FIG. 2. It does provide a background which makes the properly illuminated edge 16 optically discernible to the head 18.

FIG. 2 shows two light sources 38 and 40 in the form of optical tubes with remote lights (not shown) at the upper tube ends. The tubes are positioned on diametrically opposite sides of the optical head 18 and arranged about the lower end of the head to project beams of light whose axes 42 and 44 intersect optical axis 36 in the vicinity of the surface 12. By observing FIG. 2, and assuming that the room lighting is such that shadow region 46 is formed thereby, it will be evident that by turning light source 40 on, the light beam projected therefrom along axis 44 will eradicate or mask the room light generated shadows from templet 15, thereby eliminating the shadow which could otherwise cause the optical head 18 to sense the wrong location of the edge 16.

For purposes of illustration of the significance of the orientation of the light source consider, for example, that instead of turning on light source 40, light source 38 is turned on. It will be evident that the illumination from light source 38 would not have eliminated the room light shadow cast by templet 15, but would, indeed, in all likelihood have added thereto. It will also be found that if both light sources 38 and 40 were illuminated at the same time and were of the same intensity, the shadow 46 cast by light source 38 in the FIG. 2 arrangement would not be completely eradicated by the light provided by light source 40. It is accordingly desirable for the proper operation of the line follower that the light source be oriented, as is light source 40 in FIG. 2, with the axis thereof directed toward the raised edge to be followed from a position at the outer side of the templet and facing the raised edge. With this in mind, it will be appreciated that as optical head 18 tracks the complete periphery or edge 16 of templet 15, the operative light source may change from point to point along the periphery of the raised edge to eliminate the shadow at the segment of the periphery being tracked. It is accordingly an important teaching of this invention to provide selective illumination of the templet edge so as to prevent shadow formation as the optical line follower moves about the complete periphery of the templet. It will be noted that light beam axes 42 and 44 form an angle $\theta$ with surface 12 to prevent light glare. The angle $\theta$ is about 45°.

While any convenient light sources may be used, in my preferred embodiment I use remote lights and optical lighting tubes or fiber optic bundles connected to optical head 18 to travel therewith and selectively project light against the edge being tracked. Although only two such light sources have been identified in connection with FIG. 2, in my preferred embodiment, four such light sources are used, the two additional and similar sources 48 and 50 being best shown in FIG. 3.

Figure 3:
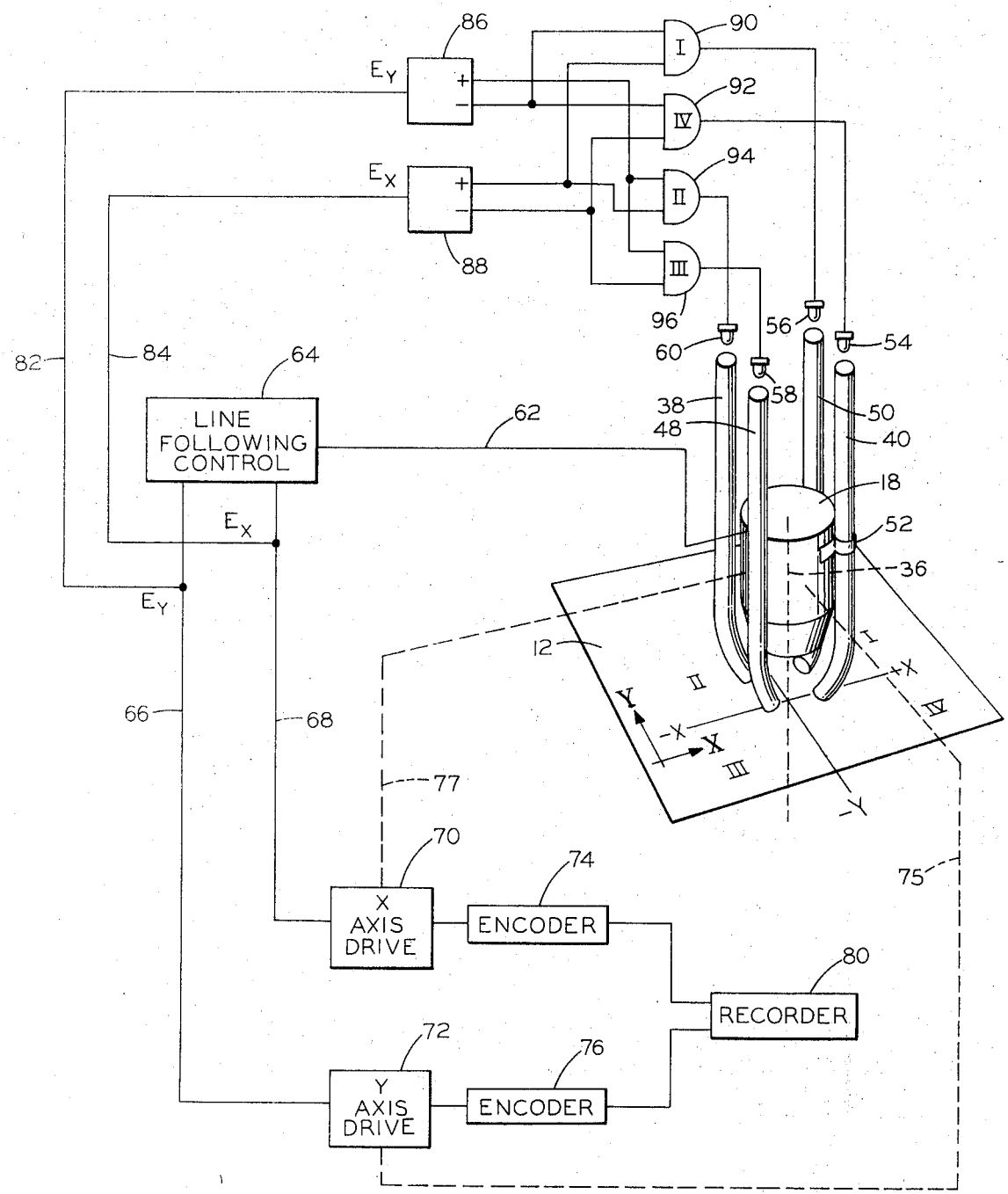
FIG. 3 is a schematic showing of the optical line follower and its illuminating and control components which selectively determine the illumination required at any given time.

In the FIG. 3 construction the diametrically opposed light sources 38 and 40 are used in conjunction with the diametrically opposed light sources 48 and 50 such that each light source is spaced approximately 90° apart around optical axis 36 and attached to the head 18 by clamps 52, one only illustrated. Also, each of the four light sources 38, 40, 48, 50 is positioned respectively above one of the four quadrants defined by the X and Y grid coordinates orthogonally intersecting the optical axis 36 directly below the moving head 18. The quadrants as defined remain centered on the optical axis and move with the head. With the light sources so positioned, each is capable of providing illumination of a segment of the raised edge 16 from the outer side of the templet 15 regardless of the orientation of the segment relative to the quadrants.

Figure 4:
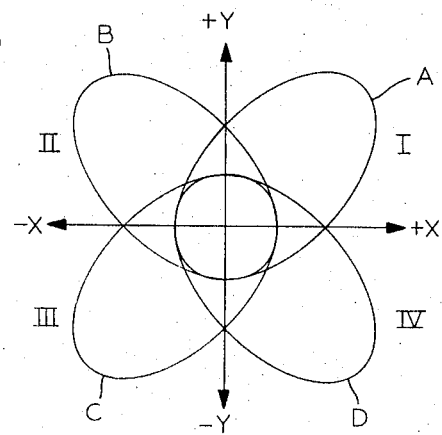
FIG. 4 is a showing of the overlapping illumination zones of the four quadrant light sources.

As illustrated in FIG. 3, light source 50 is located over quadrant I, light source 38 is located over quadrant II, light source 48 is located over quadrant III and light source 40 is located over quadrant IV. Each of the light sources is arranged to illuminate zones as shown in FIG. 4. Illumination zone A is produced by light source 50 principally in quadrant I, illumation zone B is produced by light source 38 principally in quadrant II, illumination zone C is produced by light source 48 principally in quadrant III, and illumination zone D is projected principally in quadrant IV by light source 40. Illumination zones A–D are oval in shape in view of the angular orientation of the optical tubes relative to surface 12 as described in connection with FIG. 2. While the zones are principally associated with given quadrants, they overlap at the origin or center of the quadrants intersected by the optical axis 36 so that each light zone A–D covers slightly more than its own quadrant, to insure that the raised edge 16 is fully illuminated at each segment during travel of the optical head 18 around the templet.

The overall embodiment of the invention, with a schematic of the control system, is shown in FIG. 3 to which reference will now be made. In the FIG. 3 construction, optical head 18 is positioned within light sources 38, 40, 48, 50, as in the FIG. 2 illustration. The lights 54, 56, 58 and 60 forming parts of the respective sources 40, 50, 48, 38 are positioned adjacent the upper ends of the optical tubes of the respective sources so that light energy from the lights passes downwardly through the tubes and is projected onto the edge 16 of the templet 15. By selectively illuminating lights 54, 56, 58 or 60, light energy from the corresponding tube strikes the edge 16 from the outer side of the templet and illuminates the edge without shadows. As optical head 18 scans the edge 16 electrical signals defining the position or orientation of the edge relative to the four quadrants is transmitted through the line 62 to the line following control 64 where command signals $E_x$ and $E_y$ are generated to control the movement of the head 18 along the edge. The command signals $E_x$ and $E_y$ are transmitted through lines 68 and 66, respectively, to the X-axis drive 70 including the servomotor 24 and X-carriage 20 in FIG. 1 and the Y-axis drive 72 including the servomotor 28 and the Y-carriage 22 in FIG. 1. The X-axis drive 70 moves the optical head 18 in the X-axis direction as indicated by the mechanical connection 77 and the Y-axis drive 72 moves the optical head 18 in the Y-axis direction as indicated by the mechanical connection 75. The X-axis drive 70 and Y-axis drive 72 also operate respectively the X-axis digital encoder 74 and the Y-axis digital encoder 76 for making a complete record of the templet configuration in the recorder 80.

The command signals $E_x$ and $E_y$ are also passed through lines 84 and 82 to logic circuitry which determines from the signals which of the lights 54, 56, 58 or 60 is to be on. The logic circuitry includes signal polarity discriminators or sign detectors 88 and 86 and AND gates 90, 92, 94 and 96 connected to the lights.

Figure 5A:
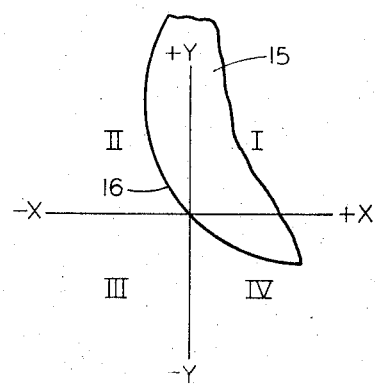
FIGS. 5a–5d are examples of tracking situations requiring illumination from different zones.

Before discussing the logic circuitry in any further detail, it is appropriate to examine by way of examples the method by which the raised edge of a templet is to be illuminated by the four light sources positioned respectively above the four quadrants through which the edge may extend. FIG. 5a shows a peripheral portion of the templet 15 at the segment of the raised edge 16 being scanned by the optical head. The segment lies in quadrants II and IV with quadrant I being covered by the rest of the templet. It is readily apparent that to illuminate the raised edge from the outer side of the templet, the light source 48 in FIG. 3 should be turned on to produce the illumination zone C primarily in quadrant III as illustrated in FIG. 4.

To reach this result with control components, it is first specified that the optical head 18 always track a templet in one direction, for example the clockwise direction. Under these conditions, the templet body will always lie to the right of the edge being tracked and, correspondingly, the outer side of the templet from which the illumination must come will be to the left. With this information established, the only other data needed to determine which of the light sources should be turned on is the orientation of the raised edge which can be readily determined by the azimuthal direction of movement of the optical head 18 which in turn is established by the signals controlling movement of the head. In the situation illustrated in FIG. 5a with the edge 16 extending from quadrant IV to quadrant II, the command signal $E_x$ would be negative and the command signal $E_y$ would be positive.

Figure 5B:
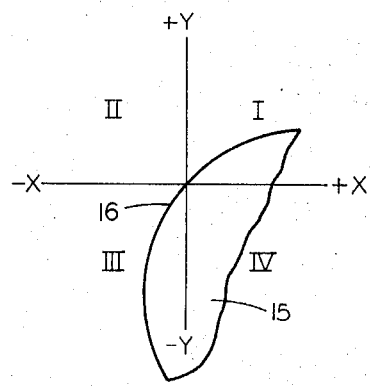

FIG. 5b illustrates the condition wherein the raised edge lies in quadrants I and III and, therefore, the command signals $E_x$ and $E_y$ would both be positive. In this situation the light source 38 should be turned on to produce the illumination zone B illustrated in FIG. 4.

Figure 5C:
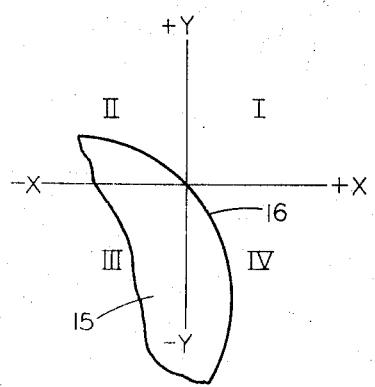

In FIG. 5c the edge extends between quadrants II and IV and the command signal $E_x$ would be positive while the command signal $E_y$ would be negative. In this situation light source 50 should be turned on to produce the illumination zone A in FIG. 4.

Figure 5D:
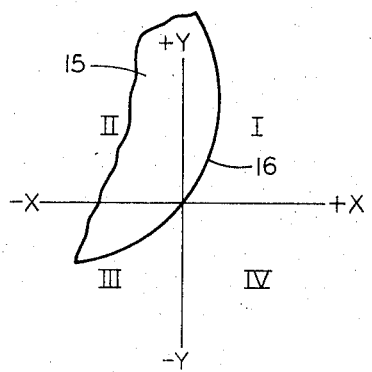

And lastly, in FIG. 5d the raised edge extends between quadrants I and III and the command signals would both be negative. In this situation, the light source 40 should be turned on to produce illumation zone D illustrated in FIG. 4.

It will thus be seen that the polarities of the command signals $E_x$ and $E_y$ are wholly determinative of the light source which is to be turned on.

The logic circuitry illustrated in FIG. 3 employs the sign detectors 86 and 88 to detect the polarity of the command signals $E_y$ and $E_x$ respectively. If the command signal $E_y$ is positive, the positive output of the detector 86 is turned on. If the command signal $E_y$ is negative, the negative output is turned on. In the same fashion the positive and negative outputs of detector 88 are turned on in accordance with the polarity of command signal $E_x$.

Each of the outputs of the detectors 86 and 88 is connected to two of the four AND gates 90, 92, 94 and 96 with appropriate logic for turning the individual light sources on at the correct time while the other sources remain off. To eliminate any hiatus that may exist when the edge being tracked extends precisely in one of the X or Y coordinate directions, the sign detectors 86 and 88 are designed to insure that the output previously turned on remains on until the command signal of opposite polarity exceeds a definite threshold.

It will thus be seen that the light source positioned at the outer side of the templet will always be turned on to illuminate the edge without generating shadows that could be sensed by the optical head 18. The information utilized to control the sequencing of the light sources 38, 40, 48 and 50 as the entire edge of the templet is tracked is determined solely from data that is normally produced by the line follower to guide the optical head along the tracked edge.

While the present invention has been described in a preferred embodiment, other modifications and substitutions can be made to the specific apparatus disclosed without departing from the spirit of the invention. For example, the lights 54, 56, 58 and 60 may be positioned adjacent the scanning head and directly above the support surface on which the templet is being tracked if suitable packaging space is available. In such case, the optical tubes which transmit the light may be eliminated. On the other hand, a single light source may be provided at the upper ends of the optical tubes and light valves in the form of diaphrams or other interrupting devices in each of the optical tubes may be controlled by the logic circuitry to pass the light energy through the appropriate optical tube to the edge from outside the templet. It is also contemplated that a more finely graduated optical switching sequence having more than four conditions or light sources may be employed and that more than one light source may be on at any given time. It is preferred that the system include at least four light sources; however, local illumination at all sides of a templet could be achieved with a three-light system. Accordingly, the present invention has been described in a preferred embodiment by way of illustration rather than limitation.

I claim:

1. Apparatus for tracking the raised edge of an object, said raised edge having an inner side facing inwardly of the object and an outer side facing outwardly of the object, comprising:
    means for supporting the object with the raised edge on a smooth surfaced member;
    tracking means mounted above said surfaced member for selected motion with respect thereto and operable to follow the edge of the object;
    means for determining the direction of motion of said tracking means during the edge following operation; and
    illuminating means capable of directing light from different positions toward either side of the raised edge and responsive to the direction determining means to selectively illuminate segments of the raised edge being followed from positions selected to direct light toward the outer side of the edge.

2. Apparatus according to claim 1 including means to record data defining said raised edge.

3. Apparatus according to claim 2 wherein said recording means includes a digital encoder.

4. Apparatus according to claim 2 wherein said tracking means is mounted for motion along orthogonal X and Y axes.

5. Apparatus according to claim 4 wherein said tracking means comprises an optical head having an optical axis which intersects a coordinate grid defined on the surfaced member by the orthogonal X and Y axes at the raised edge and which defines in the grid four conventional quadrants movable with the head.

6. Apparatus according to claim 5 wherein the illuminating means includes four light sources mounted for motion with said optical head, each of said light sources being located respectively above one of the four quadrants and oriented to direct a light beam toward the optical axis at the intersection with the raised edge of the object on said surfaced member.

7. Apparatus according to claim 6 wherein said light sources are oriented and directed so that their respective illumination zones against said supporting means lie principally in the quadrant above which the light source itself is located and extend beyond the optical axis so that the illumation zones overlap in an area in which said optical axis is located.

8. Apparatus according to claim 7 wherein said light sources comprise lights positioned remotely from said optical head and optical tubes extend between the lights and regions immediately above the respective quadrants.

9. Apparatus according to claim 8 wherein:
    the tracking means includes drive means and scanning means to determine the location of said raised edge and to provide signals to the drive means to cause motion of said scanning means selectively along said X and Y axes to thereby follow said raised edge;
    said means to determine the direction of motion determines the motion of said scanning means relative to said four quadrants; and
    said illuminating means includes means to turn on one of the light sources positioned over a quadrant on the exposed surface of the surfaced member adjacent the raised edge.

10. The method of following along the edge of a raised object using an optical follower comprising the steps of:
    establishing the location of the object edge relative to the optical follower by means of the follower;
    moving the optical follower along the edge in an edge-following operation in accordance with the location established by the follower;
    determining the direction of motion of the follower during its edge following operation; and
    selectively projecting light to be incident upon the outwardly facing side of the edge of the raised object and against the portion of the edge presently being followed in response to the follower direction of motion so determined to prevent the formation of shadows of the raised object adjacent the lighted portion of the edge.

11. The method according to claim 10 and including the step of recording data defining the object edge so followed.

12. The method of following along the edge of a raised object comprising the steps of:
    supporting the object on a smooth surfaced member;
    mounting a follower head above the object so supported for planar motion substantially parallel to the surfaced member and selectively along orthogonal axes;
    causing the follower head to move along the object edge in an edge-following operation;
    determining the momentary direction of motion of the follower head during the edge-following operation, and
    projecting light from a select position above the surfaced member toward the object edge portion as the head moves therealong in accordance with the determined momentary direction of motion to prevent shadows cast by the raised object on the surfaced member adjacent the followed edge portion.

13. The method according to claim 12 and including the further step of recording data defining the object edge followed.

14. The method according to claim 12 wherein said follower head is an optical head having an optical axis intersecting the object edge being followed during the edge following operation, and wherein the projected light is provided from light sources positioned above quadrants defined by the orthogonal axes at the intersection of the optical axis and the object edge being followed, and wherein the light sources are selectively directed to project light beams whose axes intersect the optical axis and the line portion or the object edge presently being scanned.

15. The method according to claim 12 wherein the step of projecting comprises projecting light inwardly toward the object edge portion from outside of the object.

16. Line follower apparatus for tracking lines adjacent the raised edge of an object comprising:
  means to support the raised edge object on a support surface;
  follower means mounted for motion along X and Y axes and having a reference axis orthogonal to the X and Y axes;
  means to translate said follower means along said line either in a clockwise or a counterclockwise direction about the object and with the reference axis intersecting the line and cooperating with the orthogonal axes to define four conventional quadrants moving with the follower means;
  means to establish the movement of said follower means with respect to the quadrants at each point along the line during the follower operation; and
  means to illuminate said line at each point tracked from a light source located away from the object and with light beams from the source directed toward the line without casting shadows from the raised edge of the object over the line and into one of the quadrants exposed on the support surface adjacent the object.

17. Apparatus according to claim 16 wherein said follower means is an optical follower means and said referenced axis is an optical axis.

18. Apparatus according to claim 17 wherein the movement establishing means comprises apparatus to detect the direction in which said optical follower means is moving relative to said X and Y axes during the follower operation.

19. Apparatus according to claim 18 wherein said means to illuminate comprises four light sources positioned respectively above each of the four quadrants and oriented to direct a beam of light toward the optical axis at its point of intersection with the line.

20. Apparatus according to claim 19 wherein the axes of the beams of light form an angle less than 90° with said flat support surface.

21. Apparatus according to claim 19 further including means to record information defining the shape of the line in response to follower means motion therealong.

22. The method of following a line formed at the intersection of a surface and the raised edge of an object lying on the surface at one side of the line including the steps of:
  positiong an optical follower member above the surface and the object with freedom of motion along two orthogonal X and Y axes;
  initiating motion of the follower member relative to the supporting surface along the line with its optical axis intersecting the line; and
  illuminating the line from a selected portion of a plurality of light sources located in spaced relationship about the optical axis of the follower member, the selected portion consisting of any of the light sources overlying the side of the line opposite said one side of the line.

23. Apparatus to track the raised edge of an object comprising:
  means for supporting the object on a surfaced member;
  follower means mounted above said surfaced member for selected motion with respect thereto and operable to follow the edge of the supported object;
  means for determining the location of said follower means with respect to the object edge being followed during the edge following operation; and
  means responsive to follower means locations so determined to selectively illuminate the edge of the object at the portion being followed to eliminate shadows from the raised edge on the surfaced member.

24. Apparatus according to claim 23 and including means to record data defining said object edge.

25. Apparatus according to claim 23 wherein said follower means is mounted for motion along orthogonal X and Y axes.

26. Apparatus according to claim 25 wherein said follower means is an optical follower having an optical axis which intersects axes parallel to said orthogonal X and Y axes at the point of intersection of the optical axis and object edge being followed to define four conventional right angled quadrants on the surfaced member centered at the intersection.

27. Apparatus according to claim 26 wherein the illuminating means includes four light sources mounted for motion with said optical follower, one of said light sources being located above one of said quadrants and oriented to direct a light beam toward the object edge such that the light beam axis intersects said optical axis generally at the intersection of said object edge being followed and said surfaced member.

28. Apparatus according to claim 27 wherein said one of the light sources is oriented and directed so that its illumination zone on the surfaced member lies principally in the quadrant above which the light source is located and extends beyond the optical axis.

29. Apparatus according to claim 28 wherein said one of the light sources includes a light member positioned remotely from said optical follower and an optical tube having one end adjacent the light member and an opposite end selectively positioned with respect to said optical follower and its optical axis to define said illumination zone.

30. Apparatus according to claim 29 including means to drive said follower means and wherein said follower means includes scanning means to determine the location of said object edge and to provide signals to the follower drive means to cause motion of said follower means selectively along said X and Y axes to thereby cause the follower means to follow said edge.

31. The method of line following along the edge of a raised object comprising the steps of:
  mounting a follower above the object for follower movement therearound;
  determining the location of the follower relative to the object; and
  selectively projecting light toward the object and against the edge presently being followed in response to follower location so determined.

* * * * *